US005556459A

United States Patent [19]
Cohen et al.

[11] Patent Number: 5,556,459
[45] Date of Patent: Sep. 17, 1996

[54] METHOD FOR THE REDUCTION OF SO₂ EMISSIONS AS GENERATED BY THE FLUID BED CEMENT PROCESS

[76] Inventors: Sidney M. Cohen, 2518 Washington St., Allentown, Pa. 18104; Michael E. Prokesch, 3008 Old Bethlehem Pike, Zionhill, Pa. 18981

[21] Appl. No.: 482,927

[22] Filed: Jun. 8, 1995

[51] Int. Cl.⁶ .................................................. C04B 7/45
[52] U.S. Cl. ..................... 106/744; 106/751; 106/752; 106/753; 106/759; 106/763; 106/768
[58] Field of Search ............................... 106/752, 753, 106/759, 763, 768, 744, 751

[56] References Cited

U.S. PATENT DOCUMENTS

| | | | |
|---|---|---|---|
| 4,001,030 | 1/1977 | Watson et al. | 106/768 |
| 4,173,487 | 11/1979 | Cohen | 106/743 |
| 4,179,302 | 12/1979 | Nudelman et al. | 106/752 |
| 4,469,664 | 9/1984 | Abelitis et al. | 106/752 |
| 4,584,022 | 4/1986 | Cohen | 106/753 |
| 4,708,855 | 11/1987 | Morrison | 106/752 |

*Primary Examiner*—Anthony Green
*Attorney, Agent, or Firm*—Daniel DeJoseph

[57] ABSTRACT

With the present invention, a feed preparation system for producing cement includes mixing raw materials with a source of potassium. The mixture is conveyed to feed preparation system where it is placed in condition for treatment in a fluidized bed reactor for thermal processing to produce cement clinker. The potassium combines with the SO₂ generated in the process to form potassium sulfate solids that are filtered from the process gas stream before emission to the atmosphere to thereby reduce sulfur emissions from the fluid bed cement process. The starting material may include white cement raw meal, grey cement raw meal and cement kiln dusts.

20 Claims, 3 Drawing Sheets

METHOD FOR THE REDUCTION OF SO₂ EMISSIONS AS GENERATED BY THE FLUID BED CEMENT PROCESS

BACKGROUND OF THE INVENTION

This invention relates to a process for reducing sulfur emissions which are an undesirable byproduct of a cement manufacturing process. This invention has particular utility in a fluid bed cement manufacturing process.

Sulfur is introduced to the fluid bed cement process primarily by the various forms (sulfides/sulfates) present in the cement raw materials and, secondly, by the sulfur fraction found in most fossil and waste fuels. A general sulfur balance shows that sulfur departs the process in three streams: (1) calcium sulfate and non-volatilized alkali sulfates in the cement product, (2) alkali sulfate/chloride solids collected by the particulate filtration system and (3) as $SO_2$ emitted to the atmosphere.

Processing cement plant kiln dusts also pose an emission problem as they contain relatively high concentrations of alkali sulfates and calcium sulfates. Excess sulfur generated leaves the system as gaseous $SO_2$ emissions. Typically, this level of $SO_2$ emissions at the stack is significantly greater than that generated processing cement raw mix.

Previously, options were not available to economically provide the degree of $SO_2$ control in cement forming processes utilizing either cement raw mix and/or cement kiln dust as a starting material in a manner suitable to meet stringent EPA requirements, particularly in the case of the fluid bed processing of cement kiln dusts. According to the present invention, there is described an effective method to reduce $SO_2$ emission levels from the fluid bed cement process, both in the processing of standard grey cements, white cements and cement kiln dusts.

SUMMARY OF THE INVENTION

According to the present invention, it has been discovered that the addition of potassium bearing compounds, such as KOH and $K_2CO_3$, to the raw feed of a fluid bed cement making process will result in the reduction of the amount of $SO_2$ emissions in the process. It is believed that this is the result, in part, of the production of an alkali fume in the process gas stream that readily reacts with excess $SO_2$ present. The process of the present invention is directly contrary to prior beliefs that the amount of potassium in cement feed must be severely curtailed in order to meet specifications limiting the total alkali levels in clinker.

Since typical fluid bed cement manufacturing processes generally require forming nodules, such as by pelletization, of the fine raw materials or kiln dust with the addition of water, it is convenient to add solid potassium compounds or a solution of these compounds at that point in the process. The extensive inter-mixing of the fine feed material (typically 100 mesh×0) with the potassium-bearing solution or solid in the pelletization process ensures an excellent distribution of the potassium throughout the pellet.

The reactions that occur during the sulfur absorption process are as follows:

Potassium Carbonate Source:

$$K_2CO_3 \rightarrow K_2O + CO_2\uparrow$$

$$2K_2O + 2SO_2 + O_2 \rightarrow 2K_2SO_4$$

Potassium Hydroxide Source:

$$2KOH \rightarrow K_2O + H_2O\uparrow$$

$$2K_2O + 2SO_2 + O_2 \rightarrow 2K_2SO_4$$

The potassium and sodium exit the process as recombined sulfate solids. The potassium addition creates, after exposure to the temperatures of the fluid bed reactor, a $K_2O$ fume that combines with $SO_2$ created or generated by the decomposition of the $CaSO_4$ that is present in the original feed mix. The calcium oxide formed from such decomposition is retained in the cement product. The $K_2SO_4$ precipitate from the above reactions is in the form of a concentrated alkali by-product that has the potential to be sold as a fertilizer or as a chemical source of potassium. With regard to the former option, this would be preferably accomplished by an optional conditioning system that can be included in the overall process to leach soluble alkalis from the baghouse fines and produce a potassium/sulfur rich fertilizer. The insoluble material can then be returned to the feed preparation system for reprocessing.

Potassium may also be added to the feed material in a liquid solution, generated by other processes that contain a significant concentration of potassium as a hydroxide or carbonate. For example, the source of potassium compounds for this process may be caustic waste streams, i.e. a waste brine. However, the suitability of any particular caustic waste stream to the process of the present invention will depend on the other components in the caustic waste stream, and their effect on the final cement chemistry and their contribution to process emissions.

DESCRIPTION OF THE DRAWINGS

The invention will be further described in connection with the annexed drawings wherein:

FIG. 3 is a graph that plots, inter alia, amounts of $SO_2$ emissions after the introduction of a cement kiln dust feed containing $K_2CO_3$ as an add-on.

DESCRIPTION OF THE INVENTION

Figure 1:
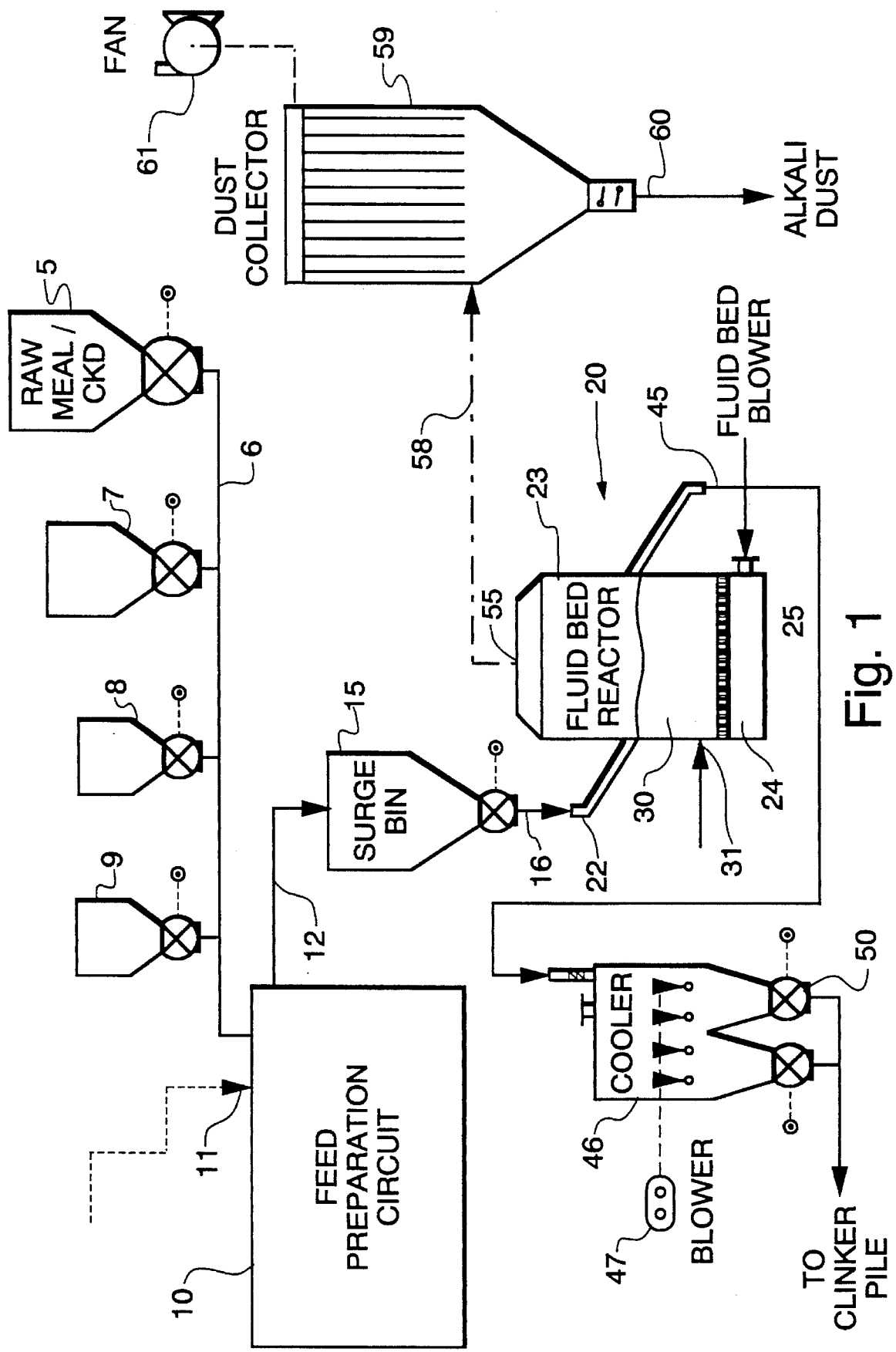
FIG. 1 is a diagrammatic view of one embodiment of the apparatus used to practice the method of the present invention.

With the present invention, cement forming raw materials, are metered from a bin such as that illustrated at 5 in FIG. 1 onto a belt conveyer 6. In one embodiment of the invention, the raw material may include some cement kiln dust (CKD) or, in fact, it may consist of all CKD. If desired, recycle product may be metered from a optional bin 7 to belt 6. If the process and apparatus is to be utilized for manufacturing white cement, the raw materials must be low in coloring elements, that is low in iron, manganese and chromium. Carbon bearing materials such as coal or coke may be added to the belt 6 from a bin 8 in an amount sufficient to bring the carbon content of the final raw material to the range of approximately 5% to 9% by weight carbon content. A source of potassium, optionally in solid form, such as $K_2CO_3$ or KOH, may be added in an amount suitable to effect a stoichiometric reaction with the $SO_2$ generated by the process and is metered onto belt 6 from bin 9. The apparatus may also optionally include additional bin or bins (not shown) which may be used for other additives if required by the process.

The material travels to feed preparation circuit 10 which may consist of dryers, mills, and/or pelletizers, etc. where the material is dried and sized for the fluidized bed. If it is desired to add the potassium in a solution form., such as in the form of a caustic waste, to the process it will be added during the feed preparation step via inlet 11. The add-on source of potassium may be added either in the form of a solid, a solution, or in both forms if desired.

As illustrated in FIG. 1, material is supplied from feed preparation circuit 10 via conduit 12 to a surge or storage bin 15. Material is metered out of the bin 15 and conveyed through line 16 to a fluidized bed reactor generally indicated at 20 for thermal processing the material to produce cement clinker. The fluidized bed reactor 20 includes a vessel having an inlet 22 for the dried and sized material from the feed preparation system 10. The vessel 20 is divided into an upper material chamber 23 and a lower plenum chamber 24 by means of a gas permeable grid 25 known in the art. The grid (air distribution plate) contains a number of orifice holes. The size and quantity of these openings are designed based on particle sizing and calculated grid pressure drop requirements. A properly designed grid plate generates a pressure drop equal to approximately one half of the bed to ensure even air distribution.

A positive displacement blower (not shown) supplies the pressurized air to the plenum. This air, before entering the plenum, passes through an auxiliary air heater (not shown) required to bring the reactor up to the fuel ignition temperature (500° C.+). The volume of pressurized air supplied to the plenum generates a superficial fluidization velocity in the reaction zone in the range of eight to twelve feet per second. This maintains the bed material in a highly active fluidized state above the air distribution plate. Inadequate velocities result in reduced capacity and inter-particular adhesion, while extreme velocities lead to rapid particle degradation. After bed combustion is self-sustaining, fuel flow to the air heater is discontinued. Gas/oil injection is started to supplement coal combustion and to control the fluid bed temperature to obtain clinkering reactions; this temperature is typically in the range of 2350° to 2450° F. (1285°–1335° C.). Means are provided for supplying air under pressure of fluidizing gas to the plenum chamber 24 for passage upwardly through the grid 25 and a bed of feed material to thereby establish and maintain a fluidized bed 30 of nodules. Fuel in addition to that combined with the feed material is supplied through inlet 31 for supporting combustion within the fluidized bed 30. The amount of fuel added is sufficient to maintain the material within the fluidized bed at cement clinkering temperatures. Typically, when carbon bearing material is incorporated in the original feed such carbon bearing material will be preferably mixed with cement raw meal in an amount sufficient to supply approximately 60 to 90% of the fuel requirements for thermal processing the feed material within the fluidized bed.

As material is supplied to the fluidized bed 30, product is discharged, such as by displacement through overflow conduit 45 to cooler 46. Material discharged from fluid bed reactor 20 is preferably discharged by displacement so that the rate of discharge of material depends upon the rate of feed of material to the vessel. Material retention time is typically on the order of 1 to 2 hours.

Product discharged through conduit 45 is supplied to cooler means 46 where it is cooled, preferably by direct contact heat exchange with cooling air supplied from a source such as a blower 47. Air heated in the cooler means may be recycled to the process, such as by utilizing the thus heated cooling air for drying materials in the feed preparation circuit thereby reducing overall fuel consumption of the process. Product discharged from cooler 46 through outlet(s) 50 may, depending upon the raw material content and the temperature of bed 30, be either cement clinker or an intermediate product. If desired, cold water coils can be used for the final cooling step of the product in heat exchanger 46.

Spend fluidizing gases may entrain a portion of the incoming feed and some fine product. Such gases will be discharged through an outlet 55 and eventually they may be supplied through conduit 58 to a high efficiency dust collector 59 wherein the solid material, typically in the form of an alkali dust, is separated and discharged at 60 and the gas is discharged to atmosphere through fan 61. In outlet 55 and conduit 58 $SO_2$ present in the off-gas stream will undergo reaction with a potassium oxide fume, which is formed by the heat decomposition of the potassium add-ons, to thereby form a potassium sulfate in the form of a fine white powder entrained in the gas stream. The potassium sulfate product will be separated from the gases in dust collector 59.

Figure 2:
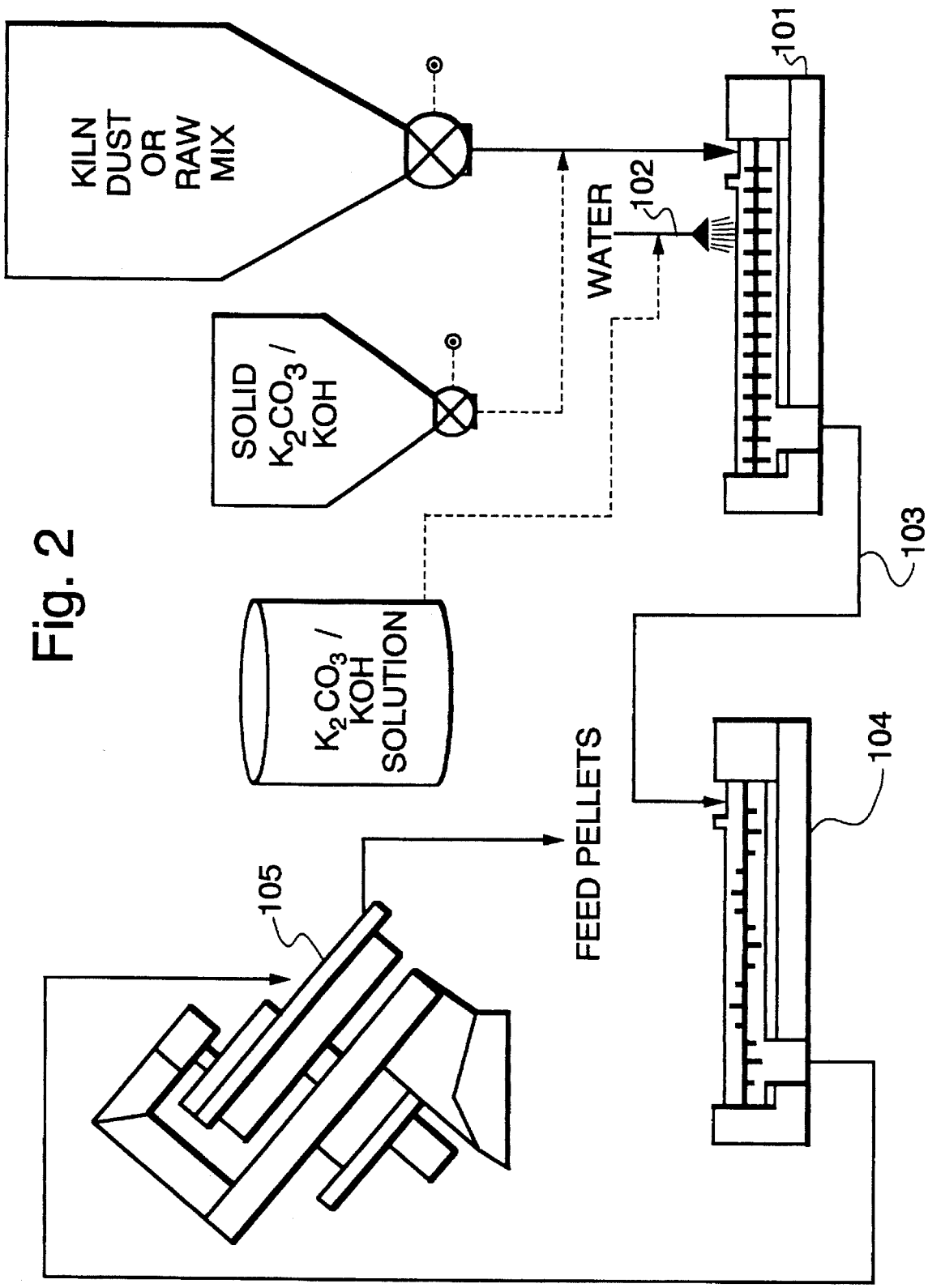
FIG. 2 is a diagrammatic view of another embodiment of the apparatus for carrying out the process of the present invention in which an embodiment of the feed preparation circuit is shown in greater detail.

FIG. 2 illustrates one embodiment of a portion of a feed preparation circuit of the present invention. In such a pelletizing circuit, raw material, which as indicated may be CKD, plus coal/coke and other additives and, if desired, a solid source of potassium are metered through bins to a pug mill 101 for mixing of the solid materials with 10–15% water supplied via conduit 102. This water is required to react any freelime present, and is needed for pellet formation. If desired, a potassium solution may be added directly to the pug mill. The wet CKD blend in the pug mill is transferred via conduit 103 to pin-type pelletizer 104 where it is formed into small, uniform pellets, which are subsequently treated in rotating disc 105 where they are densifted and hardened and the pellet sizing is controlled. The pelletized material is screened (not shown), preferably to 4×20 mesh and sent to a dryer (not shown), such as a rotary drier, which may be optionally supplied with hot air from clinker cooler 46. In an optional step, exhaust gases from the dryer may be taken to a high efficiency dust collector (not shown), and the dust collected and recycled back to the pelletizing system along with undersized pellets from screening. Oversized pellets from screening may be crushed, such as in a mill (not shown), re-screened and dried. This representative feed preparation process most preferably generates a dry, approximately 4×20 mesh, pellet (<1% $H_2O$) that is ideal for fluidized bed processing, although the actual size of the pellet feed utilized in the fluid bed process will depend on many factors including the particular needs of the individual practitioner of the invention. It has been found that some CKD samples will not pelletize properly without a binder. In these cases, approximately 2% to 5% portland cement is added as a binder to increase pellet strength and reduce particle degradation in the drying and calcining circuits. A curing period of several hours is required prior to drying of the pellets.

In another optional embodiment not depicted, a briquetting/compaction system may be instead utilized in the feed preparation circuit. Such a system requires a high-speed pug mill to blend CKD, coal and additives, including the potassium additives added according to the present invention. Following compaction, briquettes are crushed and screened, preferably to approximate 4×20 mesh with the—20 mesh fines recycled back to the briquetting unit. In this embodiment a drying circuit is typically not required as the only moisture present in the 4×20 mesh pellets is that which is present in the CKD prior to blending.

In another optional feed preparation method not depicted, an extruder may be utilized to prepare ½–1" diameter×1–2" long wet extrusions from the blended CKD prepared by the pug mill. These extrusions require drying, followed by crushing and sizing. In the preferred method, the extrusions are dried on a tray dryer to produced a hard nodule, which is then sent to storage for a period of 1 to 3 days for aging to allow the binder to increase the pellet or nodule strength. The stored or aged pellets may then be supplied to a crusher. While able to produce a suitable feed pellet, this process is at present the most energy intensive approach.

The amount of potassium added to the system will depend on the amount of available potassium and sulfur present in the cement feed materials. Available sulfur will typically be in the form of $CaSO_4$, the decomposition of which will generate the $SO_2$ in the system. Therefore the ideal molar ratios between the $K_2CO_3$ add-on and the $CaSO_4$ present in the system will be 1:1, and the ideal molar ratio between the KOH add-on and the $CaSO_4$ present will be 2:1. Obviously, the amount of potassium added to the system will depend upon the composition of the original feed (ideally, a chemical analysis of the feed material should be made to determine the ideal amount of potassium to be added) and the needs of the practitioner of the invention.

EXAMPLE

The following is an example of a potassium addition made to a cement feed material, in this case a cement kiln dust feed material for the fluid bed cement process:

Cement Kiln Dust Feed (oxide analysis: % wt. dry basis):

| | |
|---|---|
| CaO | 40.42% |
| $K_2O$ | 1.41% |
| $Na_2O$ | 0.34% |
| $SO_3$ | 4.98% |
| Cl | 0.52% |

A 100 g dust sample contains the following compounds (assuming the chloride initially combines with the $Na_2O$ present):

| | |
|---|---|
| NaCl: | 0.6435 g (0.0110 gmol) |
| KCl: | 0.2758 g (0.2758 gmol) |
| $Na_2SO_4$: | 0.0000 g (0.0000 gmol) |
| $K_2SO_4$: | 2.2907 g (0.0132 gmol) |
| $CaSO_4$: | 6.6912 g (0.0492 gmol) |
| $CaO/CaCO_3$: | 37.6700 g (0.6726 gmol CaO) |

The above calculations indicate that 0.0492 gmol $SO_2$/100 g feed would be generated as $SO_2$ gas in the fluid bed system following a 100% decomposition of $CaSO_4$ present. The following potassium addition is required to combine with this excess sulfur:

| | |
|---|---|
| $K_2CO_3$ Addition: | 6.7994 g/100 g Feed |
| | or |
| KOH Addition: | 5.5202 g/100 g Feed |

Utilizing a fluid bed processing temperature of 1300°–1320° C., a good quality, low alkali clinker was produced using an addition of potassium carbonate to the feed. The following table illustrates the clinker chemical composition and calculated cement compounds:

| | | | |
|---|---|---|---|
| $SiO_2$: | 20.37% | C3S: | 61.51 |
| $Al_2O_3$: | 4.94% | C2S: | 12.00 |
| $Fe_2O_3$: | 3.17% | C3A: | 7.73 |
| CaO: | 66.55% | C4AF: | 9.65 |
| MgO: | 3.71% | LSF: | 100.4 |
| $K_2O$: | 0.03% | HM: | 2.34 |
| $Na_2O$ | 0.04% | SR: | 2.51 |
| $SO_3$: | 0.14% | AR: | 1.56 |
| $P_2O_5$: | 0.07% | | |
| $TiO_2$: | 0.29% | | |
| $Mn_2O_3$: | 0.07% | | |
| $LOI_{@900°C.}$: | 0.40% | | |
| TOTAL: | 99.83% | | |

Figure 3:
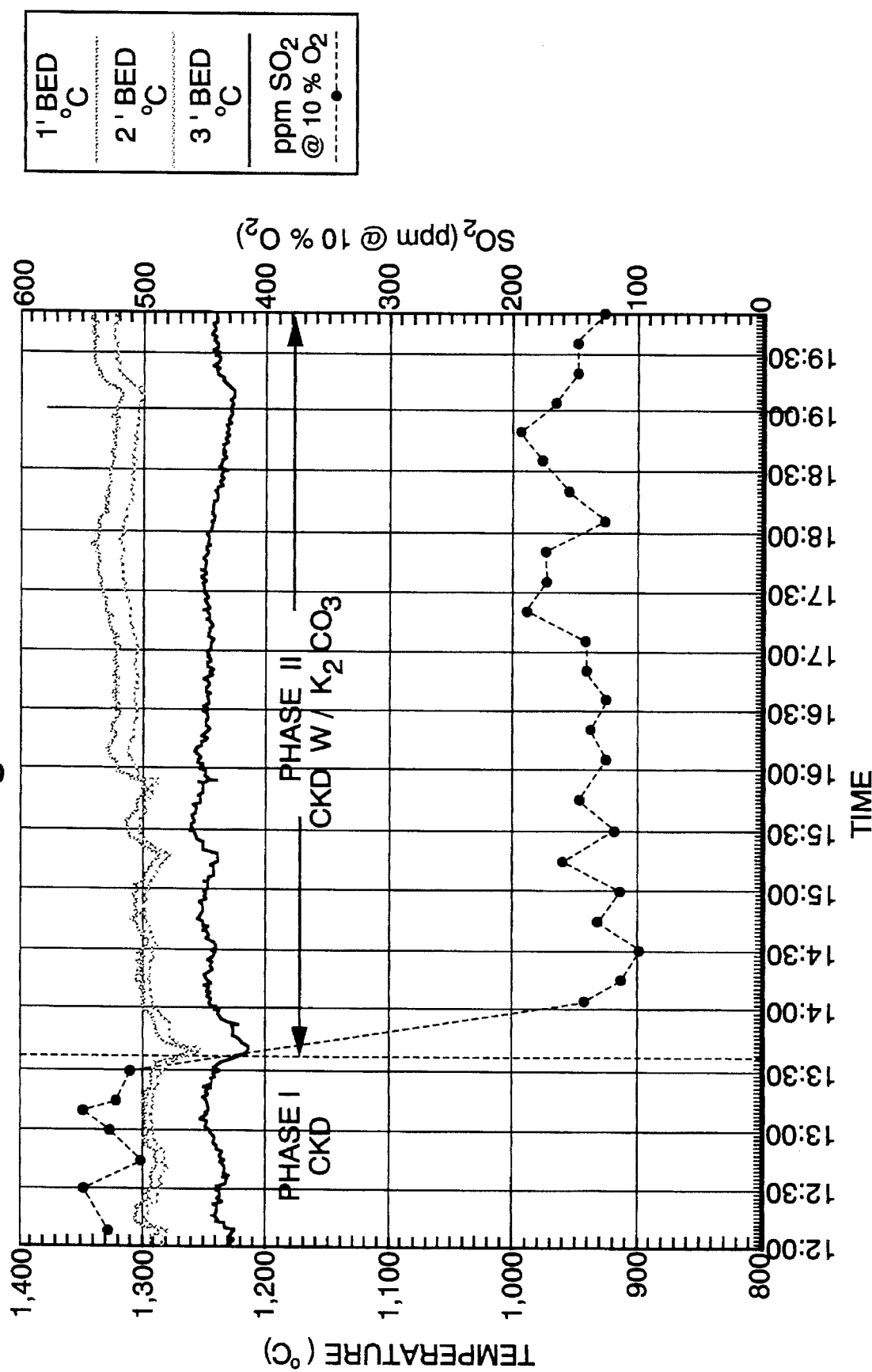

The graph of FIG. 3 illustrates the reduction in $SO_2$ emissions that occurred after introducing a cement kiln dust feed containing an addition of $K_2CO_3$. Phase I incorporated the processing of kiln dust without alkali addition, while Phase II was performed processing the same cement kiln dust feed with the addition of potassium carbonate. The reduction in $SO_2$ emissions was four fold following the introduction of the feed containing the potassium carbonate addition. Based on the clinker chemistry listed above and the $SO_2$ concentration measured in the process off gas stream, the fluid bed system was effective in volatilizing most of the alkali present in the feed material to successfully generate a low alkali clinker while reducing $SO_2$ emissions, which, if significantly reduced according to the present process may result in the practitioner of the invention not requiring modifications to the calciner or off gas handling system to meet sulfur emission limitations.

The alkali sulfate compounds formed are cooled to generate a fine, crystalline powder, which is collected at dust collector 59. Depending on the feed chemistry, this dust may be comprised of up to 90% potassium sulfate, making it suitable for marketing as a by-product.

It is intended that the foregoing be a description of a preferred embodiment, but that the invention be limited solely by that which is within the scope of the intended claims.

What is claimed is:

1. A process of producing cement clinker comprising the steps of:
   a. preparing a feed material by combining cement forming raw materials with a source of potassium to form a mixture and forming the mixture into a form suitable for use in a fluidized bed reactor;
   b. establishing and maintaining a fluidized bed of the feed material by supplying the material to a vessel and passing air upwardly through the material within the vessel at a velocity sufficient to maintain the material in a fluidized state;
   c. thermally processing the feed material within the fluidized bed to produce cement clinker and a process gaseous off stream including $SO_2$;
   d. reacting potassium from the potassium source with $SO_2$ to produce potassium sulfate solids;
   e. filtering the potassium sulfate solids from the process gas stream; and
   f. discharging cement clinker from the vessel.

2. A process of producing cement clinker according to claim 1 wherein the step of preparing a feed material further includes forming the material into nodules having a size in the range of approximately 4×20 mesh.

3. A process of producing cement clinker according to claim 2 wherein the nodules are formed by extrusion.

4. A process of producing cement clinker according to claim 2 wherein the nodules are formed by pelletizing the mixture.

5. A process of producing cement clinker according to claim 1 wherein the feed material is prepared from white cement raw meal.

6. A process of producing cement clinker according to claim 1 wherein the feed material is prepared from grey cement raw meal.

7. A process of producing cement clinker according to claim 1 wherein the feed material is prepared from cement kiln dusts.

8. A process of producing cement clinker according to claim 1 wherein the source of potassium is a solid material.

9. A process of producing cement clinker according to claim 6 wherein the source of potassium is KOH.

10. A process of producing cement clinker according to claim 6 wherein the source of potassium is $K_2CO_3$.

11. A process of producing cement clinker according to claim 1 wherein the source of potassium is a waste brine solution containing concentrations of potassium as a carbonate or hydroxide.

12. A process of producing cement clinker in a fluidized bed comprising the steps of:

preparing a feed material for the fluidized bed by combining cement forming raw materials with a carbon bearing material fuel source for the fluidized bed and a source of potassium bearing material to form a mixture and forming the mixture into nodules;

establishing and maintaining a fluidized bed of the feed material by supplying the nodules to a vessel and passing air upwardly through the material within the vessel at a velocity sufficient to maintain the nodules in a fluidized state;

thermally processing the feed material within the fluidized bed by combustion of the carbon bearing material in an amount sufficient to provide from 60 to 90% of the fuel needed to maintain the fluidized bed at a temperature in the range of approximately 2350° to 2450° F. and supplying the balance of the fuel needed to the fluidized bed to produce cement clinker and a gaseous stream including $SO_2$, and reacting potassium from the add-on potassium source with $SO_2$ to produce potassium sulfate solids;

filtering the potassium sulfate solids from the gas stream; and discharging cement clinker from the vessel.

13. A process of producing cement clinker comprising the steps of:

a. feeding a cement forming material and a source of potassium to a fluidized bed reactor;

b. thermally processing the material within the fluidized bed to produce cement clinker and a gaseous stream including $SO_2$;

c. reacting potassium from the add-on potassium source with $SO_2$ to produce potassium sulfate solids;

d. filtering the potassium sulfate solids from the gas stream; and e. discharging cement clinker from the vessel.

14. A process of producing cement clinker according to claim 13 wherein the material is prepared from white cement raw meal.

15. A process of producing cement clinker according to claim 13 wherein the material is prepared from grey cement raw meal.

16. A process of producing cement clinker according to claim 13 wherein the material is prepared from cement kiln dusts.

17. A process of producing cement clinker according to claim 13 wherein the source of potassium is a solid material.

18. A process of producing cement clinker according to claim 17 wherein the source of potassium is KOH.

19. A process of producing cement clinker according to claim 17 wherein the source of potassium is $K_2CO_3$.

20. A process of producing cement clinker according to claim 17 wherein the source of potassium is a waste brine solution containing concentrations of potassium as a carbonate or hydroxide.

* * * * *